United States Patent [19]
Leifeld

[11] Patent Number: 5,461,757
[45] Date of Patent: Oct. 31, 1995

[54] APPARATUS FOR MEASURING THE SLIVER DENSITY AT A TAPERING SLIVER GUIDE IN A DRAFTING FRAME

[75] Inventor: Ferdinand Leifeld, Kempen, Germany

[73] Assignee: Trützschler GmbH & Co. KG, Möchengladbach, Germany

[21] Appl. No.: 222,792

[22] Filed: Apr. 4, 1994

[30] Foreign Application Priority Data

Apr. 2, 1993 [DE] Germany ............... 43 10 820.2
Feb. 11, 1994 [DE] Germany ............... 44 04 326.0

[51] Int. Cl.$^6$ ............... D01H 5/72; D01H 5/38
[52] U.S. Cl. ............... 19/239; 19/150
[58] Field of Search ............... 19/150, 157, 239, 19/240

[56] References Cited

U.S. PATENT DOCUMENTS

| | | | |
|---|---|---|---|
| 4,266,324 | 5/1981 | Hasegawa et al. | 19/239 |
| 4,267,620 | 5/1981 | Allen, Jr. | 19/239 |
| 4,754,527 | 7/1988 | Gilhaus | 19/157 |
| 4,864,853 | 9/1989 | Grunder et al. | 19/240 X |
| 4,949,431 | 8/1990 | Gasser | 19/150 |
| 5,018,246 | 5/1991 | Leifeld | 19/150 |
| 5,343,598 | 9/1994 | Hauner | 19/150 X |

FOREIGN PATENT DOCUMENTS

| | | |
|---|---|---|
| 2183903 | 12/1973 | France. |
| 3913548 | 10/1990 | Germany. |
| 1135752 | 12/1968 | United Kingdom. |
| 1372513 | 10/1974 | United Kingdom. |
| 2225634 | 6/1990 | United Kingdom. |
| 2235472 | 3/1991 | United Kingdom. |
| 87/04472 | 7/1987 | WIPO. |

*Primary Examiner*—John J. Calvert
*Attorney, Agent, or Firm*—Spencer, Frank & Schneider

[57] ABSTRACT

A drafting frame includes a drafting unit for drafting a plurality of slivers running in an advancing direction and combining the slivers into a single sliver; and a sliver guide situated upstream of the drafting unit. The sliver guide has converging walls defining a cavity for guiding therein the plurality of slivers which are gathered by the cavity in a side-by-side orientation in a single plane. A sensor element is supported for displacement relative to the sliver guide. The sensor element has a sliver-contacting face movable toward and away from a counterface forming part of the cavity wall and defining therewith a constriction of the sliver guide. A force urges the sliver-contacting face of the sensor element towards the counterface to compress the slivers running through the constriction. A transducer is coupled to the sensor element for emitting a signal representing excursions of the sensor element in response to thickness fluctuations of the slivers running through the constriction. Further, a pull-off roll pair is situated downstream of the sliver guide and upstream of the drafting unit. The pull-off roll pair which defines a nip between which the slivers pass, pulls the slivers from the sliver guide.

24 Claims, 9 Drawing Sheets

APPARATUS FOR MEASURING THE SLIVER DENSITY AT A TAPERING SLIVER GUIDE IN A DRAFTING FRAME

CROSS REFERENCE TO RELATED APPLICATION

This application claims the priority of German Application No. P 43 10 820.2 filed Apr. 2, 1993 and German Application No. P 44 04 326.0 filed Feb. 11, 1994, which are incorporated herein by reference.

BACKGROUND OF THE INVENTION

This invention relates to an apparatus for measuring the density (thickness) of a sliver bundle at a forwardly tapering sliver guide of a drafting frame as the sliver bundle runs through the sliver guide. The sliver guide gathers a plurality of incoming slivers into a single bundle which passes through a roll pair downstream of the sliver guide as viewed in the direction of sliver advance. A movable, biased sensor element cooperates with a stationary counterface and defines therewith a constricted location for the throughgoing sliver. The change in position of the sensor element in response to variations in the sliver density affects a transducer for generating a control pulse.

In a known apparatus of the above-outlined type, an arrangement for guiding the slivers at the drafting frame input is provided. The arrangement includes a conically tapering sheet metal support tray for the slivers, provided with laterally upwardly bent wall surfaces, downstream of which there is situated the sliver guide having a rectangular inlet cross section as well as closely arranged top and bottom surfaces and conically converging lateral surfaces. The side-by-side arranged, inputted slivers glide off the tray surface formed of the sheet metal support tray as well as the bottom surface of the sliver guide. In the inlet zone between the inputted slivers and the lateral walls an intermediate space is present. The sliver guide is situated immediately upstream of a withdrawing roll pair whose parallel axes are oriented vertically. The roll pair simultaneously serves for measuring the sliver thickness within a predetermined tolerance range and the rolls may vary the distance from one another as a function of the thickness of the sliver undergoing measurement. The movable, spring-biased roll functions as a movable sensor element and is displaceable in a horizontal direction relative to the other, stationarily held roll. The stationary roll is formed of three discs arranged in an axial series. The middle disc has a lesser diameter than the two flanking discs whereby the roll periphery has a circumferential groove (grooved roll). The spring loaded movable roll is formed of a single disc which, along its circumferential zone extends into the groove of the stationary roll. The circumferential face of the middle disc of the grooved roll forms the stationary counterface for the circumferential face of the movable tongue roll. By means of the groove-and-tongue construction a constricted location of essentially rectangular cross-sectional configuration is formed through which the sliver composed of the gathered (compressed) slivers is passed for measurements.

In operation of the above-outlined arrangement, the individual slivers run into the sliver guide at the inlet of the drafting frame with a speed of, for example, 150 m/min. By virtue of the conically converging wall configuration of the sliver guide, the slivers are gathered into one plane in a side-by-side position without clamping. The slivers exiting the sliver guide are first densified by passing through the nip of the downstream-arranged roller pair, that is, they are compressed essentially to the material cross section and thus air is expelled from the slivers so that sliver measurement can take place. The circumferential speed of the rolls and the running speed of the sliver are identical, and thus no speed difference between the roll pair and the slivers exists. The clamping effect which is necessary for the sliver withdrawal from the sliver guide is utilized simultaneously for densification for measurement. After the sliver exits the nip of the roller pair, the slivers again separate from one another in the lateral direction and enter the after-connected drafting frame.

The above-outlined known apparatus has several disadvantages: it is structurally complex and expensive, and the groove-and-tongue configuration of the measuring rolls has to be manufactured with precision to ensure an exact fit. Further, the rolls have to be precisely aligned during assembly. The central disc of the grooved roll and the tongue roll also require high manufacturing accuracy (small tolerances): the diameter of the two discs must be identical to ensure that the circumferential speed of the two components is the same to avoid a drafting (stretching) of the slivers. Further, the two discs must have a high-precision circular run to avoid measuring errors. Even a small misalignment between the grooved roll and the tongue roll causes measuring errors.

It is a further disadvantage of the above-outlined known constructions that upon acceleration and deceleration of the rolls centrifugal forces are generated which lead to measuring errors. It is also a disadvantage that the drive for the two rolls is complex, particularly because the rotary drive needs to be designed for use with an axially shiftable roll and that both rolls of the roll pair have to be driven rolls. The drive for the displaceable (pivotal) roll includes a spur gear pair, one gear of which is mounted on the shaft of the roll whereas the other gear is arranged coaxially to the pivot axis of the pivot arm for the shiftable roll. As a result of this arrangement the gear pair remains in a meshing relationship even during pivotal motion of the arm. To obtain the required, oppositely oriented rotation of the two rolls, a further gear has to be used as an intermediate gear which, apart from a complex and expensive structure, disadvantageously introduces a relatively large play between teeth of meshing gears which may lead to significant inaccuracies.

SUMMARY OF THE INVENTION

It is an object of the invention to provide an improved apparatus of the type outlined above from which the discussed disadvantages are eliminated, which, in particular, is structurally simple and makes possible an improved measurement of the sliver at the inlet of the drafting frame.

This object and others to become apparent as the specification progresses, are accomplished by the invention, according to which, briefly stated, the drafting frame includes a drafting unit for drafting a plurality of slivers running in an advancing direction and combining the slivers into a single sliver; and a sliver guide situated upstream of the drafting unit. The sliver guide has converging walls defining a cavity for guiding therein the plurality of slivers which are gathered by the cavity in a side-by-side orientation in a single plane. A sensor element is supported for displacement relative to the sliver guide. The sensor element has a sliver-contacting face movable toward and away from a counterface forming part of the cavity wall and defining therewith a constriction of the sliver guide. A force urges the sliver-contacting face of the sensor element towards the counterface to consolidate the slivers running through the constriction. A transducer is coupled to the sensor element for emitting a signal representing excursions of the sensor element in response to thickness fluctuations of the slivers running through the constriction. Further, a pull-off roll pair is situated downstream of the sliver guide and upstream of the drafting unit. The pull-off roll pair which defines a nip between which the slivers pass, pulls the slivers from the sliver guide.

By virtue of the invention, the slivers are consolidated and sensed already in the sliver guide so that the roll pair arranged downstream of the sliver guide as viewed in the direction of sliver advance, merely has the function of drawing off the sliver whose thickness was previously sensed. The measures according to the invention provide for a separation of functions by virtue of the fact that the sensor element arranged upstream of the withdrawing (pull-off) roll pair simultaneously compresses and senses the slivers in a simple manner. The downstream-arranged rolls, by virtue of the fact that they merely serve as pull-off rolls, may be structurally and as far as installation is concerned, significantly simpler than it has been possible heretofore. Particularly by eliminating the measuring function of the rolls that adjoin the sliver guide downstream thereof, the significant problems and complexities involving measurement performed by known apparatus are avoided. According to the invention, the slivers undergo a stepped, separate treatment as concerns a consolidation required for sensing and as concerns a compression required for withdrawing the sliver bundle from the sliver guide. Thus, according to the invention, an apparatus is provided whose structure and installation is simplified and which permits an improved measurement of the sliver thickness at the inlet of the drafting frame.

The invention further has the following additional advantageous features:

The movable sensor element of the sliver guide is arranged in the zone of the constriction of the sliver guide where the slivers are gathered in a side-by-side orientation and has a slide surface which presses the slivers in a side-by-side compressed state against the stationary counterface forming part of the sliver guide and the roll pair pulls the slivers, compressed in the constriction, in a side-by-side relationship. The distance between the movable sensor element and the nip of the roll pair is advantageously equal to or less than the staple length of the fiber material, or the distance between the outlet of the sliver guide and the nip of the roller pair is equal to or less than the staple length of the fiber material.

The sensor element is movable in a horizontal direction perpendicularly to the advancing direction of the sliver.

The sensor element is movable in a vertical direction perpendicularly to the advancing direction of the sliver.

The sliver guide has at least one aperture through which the sensor element projects from the exterior into the guiding cavity of the sliver guide.

The outlet of the sliver guide immediately adjoins the nip of the calender roll pair.

The constriction of the sliver guide immediately adjoins the outlet of the sliver guide.

The sliver pull-off force is greater than the sliver measuring force.

The aperture through which the sensor member extends is rectangular.

The sensor element is an approximately rectangular member whose longitudinal edges extend perpendicularly to the advancing direction of the sliver and whose shorter edges extend parallel to such advancing direction.

The outer end of the sensor element is at a small distance from the outlet of the sliver guide, spaced towards the sliver withdrawing roll pair.

The sensor element is supported in a stationary rotary bearing.

A lever of the rotary bearing cooperates with a force-exerting element such as a counterweight or spring.

The sensor element is supported for displacement in a horizontal direction.

The sensor element is resiliently supported at one end.

The sensor element is supported by a holding member, such as a lever.

The sensor element is supported to be rotatable about a vertical axis.

The sensor element has at least one inductive measuring element including a plunger armature and a plunger coil.

The measuring element is an analog contactless distance sensor, for example, an inductive proximity initiator.

The sensor element cooperates with an abutment.

The sensor element is biased and supported by at least one force-exerting arrangement.

The constriction of the sliver guide has a construction similar to a photographic shutter which has inner sliding faces.

The movably supported sensor element projects through an opening in the wall of the sliver guide and, with a slide face, exerts a force on the sliver so that the latter is compressed to a purely material (airless) cross section.

The constriction of the sliver guide has two parallel surfaces between which fits a part of the movably supported sensor element.

That wall of the sliver guide which is situated opposite the movably supported sensor element is oriented perpendicularly to the parallel wall faces of the sliver guide.

The biasing of the movably supported sensor element is effected by mechanical, electrical, hydraulic or pneumatic means, for example, springs, weights, inherent resiliency, power cylinder, magnets or the like which may be adjustable.

The movably supported sensor element is an angled lever, which approximately at the elbow location is supported in the aperture of the sliver guide, and either the angled lever or the sliver guide is stationarily supported and the angled lever is spring biased.

The spring which biases the angled lever engages an adjustable countersupport.

The axes of the pull-off rolls are oriented horizontally.

The axes of the pull-off rolls are oriented vertically.

Upstream of the sliver guide an additional sliver guide is arranged and the zone between the two sliver guides communicates with the ambient atmosphere by means of at least one aperture.

The sliver guide is provided with at least one air vent.

The outlet of the sliver guide has a rectangular cross-sectional area.

The outlet of the sliver guide extends into the bight of the pull-off roll pair to the immediate vicinity of the nip of the pull-off roll pair.

The lateral guiding walls of the sliver guide converge conically in the direction of the sliver advance.

The bottom wall and the top wall of the sliver guide converge conically in the direction of sliver advance.

The fixed wall element of the sliver guide, situated opposite the sensor element, may be length adjustable, for example, by means of a setscrew.

The sensor element has a trapezoidal configuration.

The slide face of the sensor element is of outwardly convex (rounded) configuration.

The inner face of the lateral wall of the sliver guide and the sensor element are in a flush relationship.

From the thicknesses of the individual slivers an average value is determined.

The stationary counterface of the sliver guide cooperating with the sensor element is a slide face along which the slivers glide.

The slide face of the sensor element is linear in the longitudinal direction.

Upstream of the sliver guide a crushing roll pair is arranged.

Downstream of the sliver guide there is arranged the first drafting roll pair which constitutes the pull-off roll pair.

The delivery speed is approximately 150 m/min.

The pulling force of the pull-off rolls is greater than the clamping force at the constriction of the sliver guide.

The clamping force is smaller than the rupturing force for the sliver.

At least the top wall of the sliver guide may be pivoted open or closed.

The top wall is mounted on a hinge.

The pull-off roll pair is a calender roll pair.

The edges of the sliver guide are deburred.

The sliver guide is a cast component.

The faces of the sliver guide that come into contact with the sliver have low-friction characteristics.

The slide face of the sensor element contacting the sliver has low-friction characteristics.

The sliver guide is enameled at least in the zone of the contact faces.

The slide face of the sensor element is enameled.

The sliver guide is a glass component.

The sliver guide is of a ceramic material.

At least the slide face of the sensor element is of a glass.

The slide face of the sensor element is of a ceramic material which is preferably a sintered ceramic or an oxide ceramic.

The sliver guide is a metal.

The faces which contact the sliver are polished.

The faces which contact the sliver are tempered.

The faces which contact the sliver have hard material inserts.

The sliver guide has an essentially rectangular cross-sectional area of the sliver passage that leads to the constriction.

The cross-sectional area of the sliver guide passage of the sliver guide tapers in the direction of the sensor element.

At least one of the walls bounding the cross-sectional area is inclined towards the oppositely located wall to effect the cross-sectional tapering.

The sliver guiding passage of the sliver guide has the shape of a truncated pyramid.

The sensor element passes through a narrow side of the passage of the sliver guide.

BRIEF DESCRIPTION OF THE DRAWINGS

FIG. 1b is an enlarged schematic top plan view of some of the components of the structure illustrated in FIG. 1a.

FIG. 6b is an elevational view taken in the direction of the arrow VIb of FIG. 6a.

FIG. 11b is a sectional view taken along line XIb—XIb of FIG. 11a.

FIG. 12b is a schematic top plan view (with one of the top rolls omitted) of the construction shown in FIG. 12a.

FIG. 14b is a sectional view taken along line XIVb—XIVb of FIG. 14a.

DESCRIPTION OF THE PREFERRED EMBODIMENTS

Figure 1A:
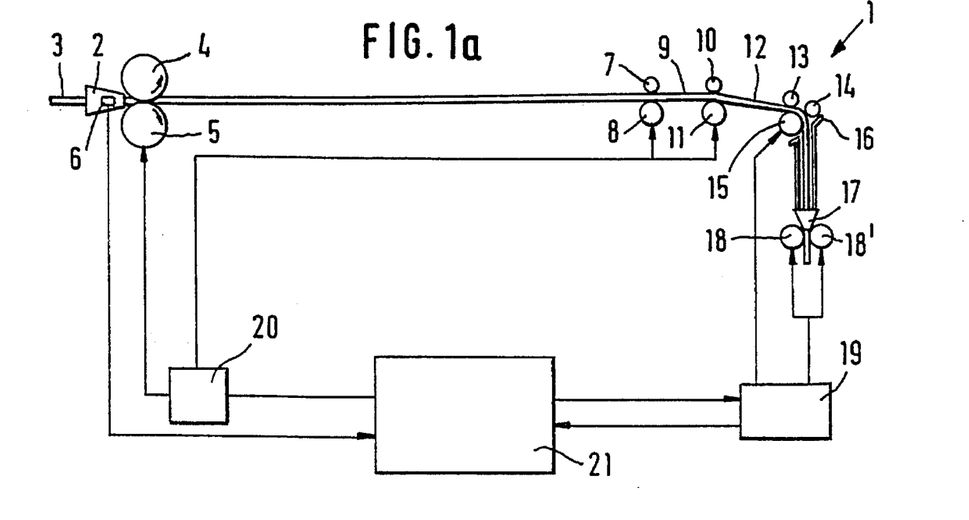
FIG. 1a is a schematic view, with block diagram, of a sliver density regulating system utilized in an otherwise conventional drafting frame.

Turning to FIG. 1a, there is schematically shown therein a high-production drafting frame of the model HS 900 manufactured by Trützschler GmbH & Co. KG, Möcnchengladbach, Germany. The slivers 3 drawn from non-illustrated coiler cans, enter a sliver guide 2 and, drawn by the pull-off rolls 4, 5, pass by a measuring member 6. The drafting unit is essentially formed by the upper drafting unit inlet roll 7 and the lower drafting unit inlet roll 8. These rolls are associated with the preliminary drafting zone 9 which has a predrafting upper roll 10 and a predrafting lower roll 11. A principal drafting zone 12 is situated between the predrafting roll pair 10, 11 and a roll pair formed of an upper principal drafting roll 13 and a lower principal drafting roll 15. With the lower principal drafting roll 15 there is associated a second upper principal drafting roll 14. This arrangement is thus a "four over three" drafting system.

The drafted (stretched) slivers 3 reach, after passing the upper principal drafting roll 14, a guide assembly 16 and are, by means of delivery rolls 18, 18' drawn into a sliver trumpet 17 where the slivers are gathered into a single sliver and deposited in non-illustrated coiler cans. The principal drafting rolls 13, 14, 15 and the delivery rolls 18, 18' are driven by a main motor 19 which is controlled by a computer 21. The computer 21 also receives signals from the measuring member 6 at the sliver guide 2 and converts them into commands to control the motor 20 which drives the upper pull-off roll 4, the lower pull-off roll 5 as well as the rolls of the predrafting zone 9, that is, the upper inlet roll 7, the lower inlet roll 8, the upper predrafting roll 10 and the lower predrafting roll 11. The thickness fluctuations of the sliver are, as a function of such values determined by the measuring member 6, controlled by the computer 21 by means of the regulator motor 20 by changing the rpm of the rolls 4, 5, 7, 8, 10 and 11.

Figure 1B:
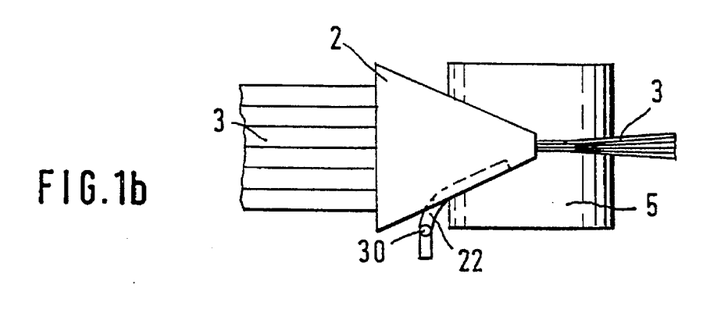

FIG. 1b shows the sliver guide 2 and the lower pull-off roll 5. The slivers 3 are gathered in the sliver guide 2. The measuring member 6 shown in FIG. 1a is constituted by a contact element (sensor element) 22 held in a rotary bearing 30 and having two arms. One arm is in contact with the slivers 3 while the other arm is exposed to a biasing force as will be described in more detail later.

Figure 2:
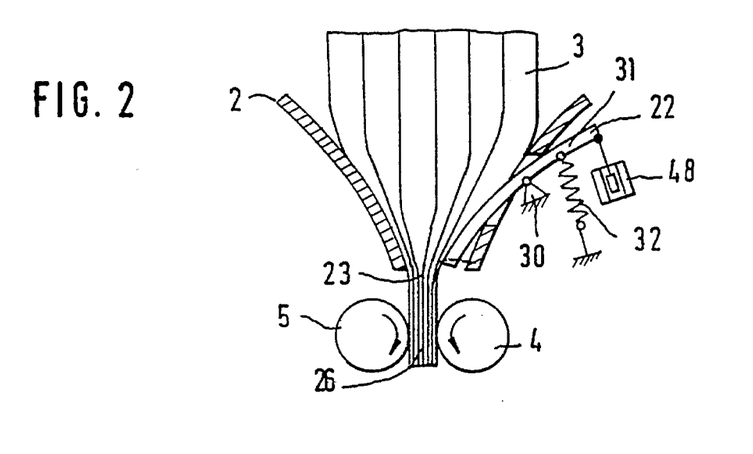
FIG. 2 is a sectional top plan view of the sliver guide shown in FIG. 1b, illustrating vertically oriented pull-off rolls.

The sectional FIG. 2 illustrates how the individual slivers 3 are gathered in a side-by-side position in the sliver guide 2 and sensed at the constriction 23 of the sliver guide 2 by engagement with the contact element (sensor element) 22. The sensor element 22, supported in the rotary bearing 30, has an arm 31 to which force is exerted by a tension spring 32. The sensor element 22 is coupled with a measuring element 48 having a plunger armature/coil assembly. Changes in the fiber quantities of the running fiber slivers 3 are sensed as thickness or density fluctuations, causing excursions of the contacting sensor element which, in turn, causes corresponding movements of the plunger armature to generate signals representing the sliver quantity fluctuations.

As a departure from the FIG. 1b structure, in FIG. 2 the pull-off rolls 4 and 5 have vertically oriented rotary axes which thus means that the slivers run in a vertically superposed position into the nip 26 of the pull-off rolls 4, 5.

Figure 3:
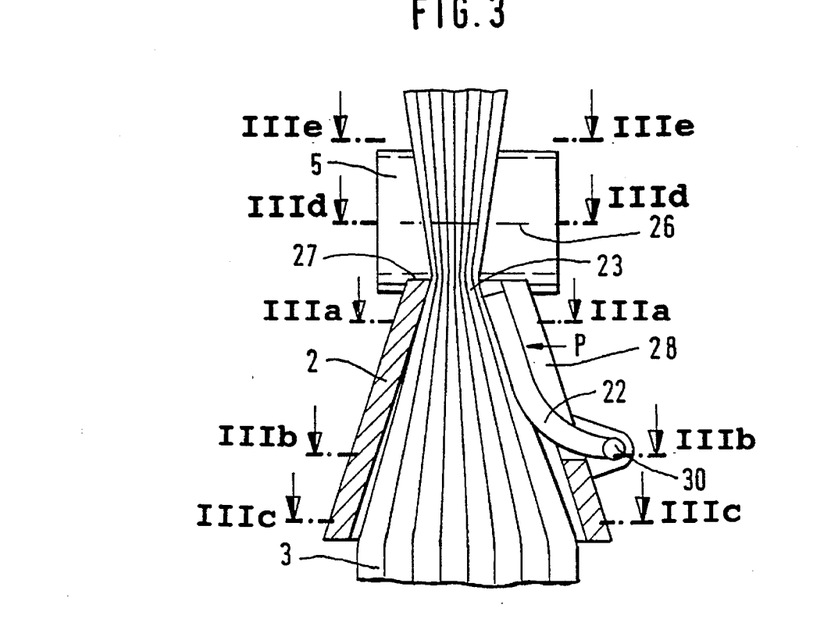
FIG. 3 is a sectional top plan view of a sliver guide illustrating a horizontally oriented pull-off roll.

FIG. 3 illustrates a sectional top plan view of the sliver guide 2. Similarly to FIG. 1b, the top pull-off roll 4 is omitted for clarity. Both rolls 4 and 5 are oriented horizontally. A force P whose source is not shown, is directed to the sensor element 22 which, as a result, compresses (densifies) the parallel-arranged slivers 3 in the constriction 23 for measuring purposes.

Figure 3A:
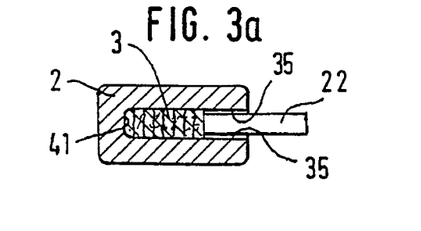
FIGS. 3a through 3e are sectional views taken along lines IIIa—IIIa through IIIe—IIIe of FIG. 3.
Figure 3B:
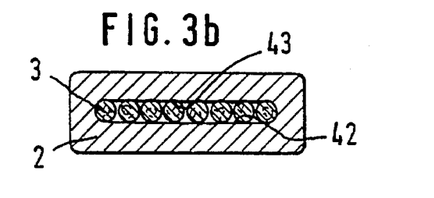
Figure 3C:
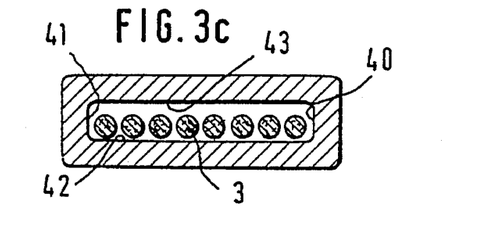
Figure 3D:
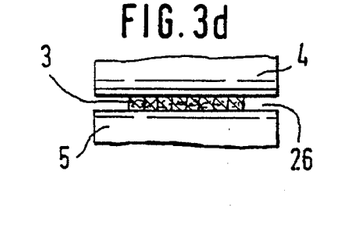

FIGS. 3a through 3e show sections of the FIG. 3 structure, taken along respective section lines IIIa—IIIa through IIIe—IIIe in FIG. 3. As seen in FIG. 3c, eight slivers 3 enter into the sliver guide 2 which is bounded by lateral walls 40, 41, a top wall 43 and a bottom wall 42. Between the slivers 3, the side walls 40, 41 and the top wall 43 a significant free space (air volume) is present which is greatly reduced by virtue of the conical convergence of the walls 40, 41, 42, 43 as shown in FIG. 3b.

Figure 3E:
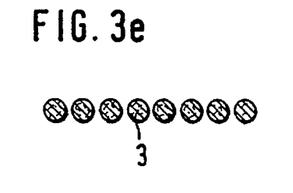

FIG. 3a is a sectional view of the constriction 23, that is, the region where the bottom wall 42 and the top wall 43 of the sliver guide 2 extend parallel to one another and the sensor element 22, with its slide face 34, presses the side-by-side arranged slivers 3 against a counterface 41. The pull-off rolls 4, 5 pull the compressed slivers 3 through the outlet 27 of the sliver guide 2. The pressing effect exerted between the pull-off rolls 4, 5 occurs at their nip 26 which is illustrated in section in FIG. 3d. At this location the greatest consolidation of the slivers 3 is obtained. Thereafter the individual slivers 3 again fan out as shown in FIG. 3e.

Figure 4:
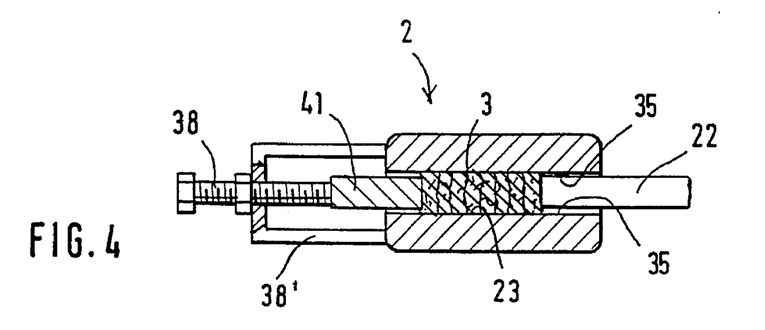
FIG. 4 is a sectional view of parts forming the constriction of a sliver guide.

Turning to FIG. 4, there is illustrated therein an embodiment of the invention relating to an adjustment of the constriction 23 of the sliver guide 2. Similarly to FIG. 3a, the top and bottom walls extend as parallel faces 35. The FIG. 4 embodiment differs from the FIG. 3 and 3a construction in that the counterface 41, that is, the wall of the sliver guide which is situated opposite the sensor element 22 is adjustable in the zone of the constriction 23. Such adjustment may be effected by a setscrew 38 supported in a bracket 38' which, in turn, is mounted on the exterior of the sliver guide 2.

Figure 5:
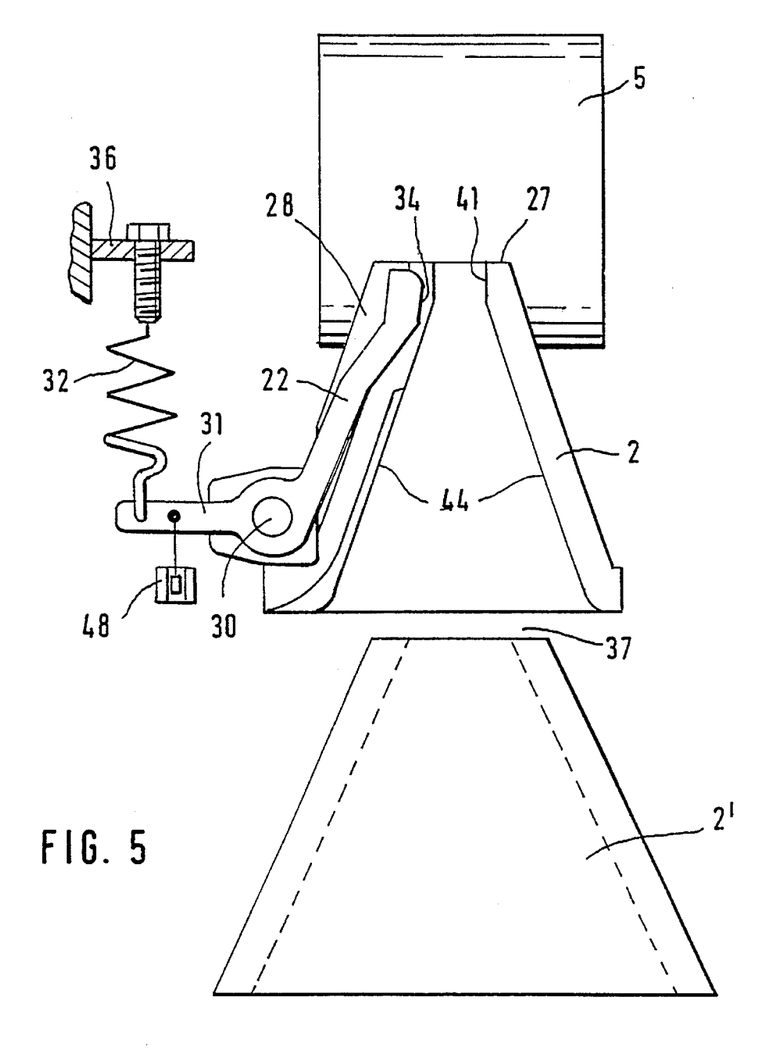
FIG. 5 is a sectional top plan view illustrating two serially arranged sliver guides.

In FIG. 5 two sliver guides 2, 2' are shown in a series arrangement. In this embodiment, the slivers 3 first enter the upstream-arranged sliver guide 2' and are compressed thereby. The second, downstream-arranged sliver guide 2 is at a small distance from the sliver guide 2' so that air may escape through this clearance which, for all practical purposes, constitutes an air vent 37. In the sliver guide 2 an additional compression of the slivers 3 occurs which closely lie at the inner wall of the sliver guide 2, that is, against the contact faces 44. To reduce friction, the contact faces 33 are polished, enamelled or provided with smooth hard-substance inserts.

The sensor element 22 is disposed in a recess 28 of the sliver guide 2 and is supported by a rotary bearing 30. The sensor element 22 has a lever 31 biased by a tension spring 32 attached to a countersupport 36. With the lever 31 a measuring element 48 is connected which is constituted by a plunger armature/coil instrument.

Figure 6A:
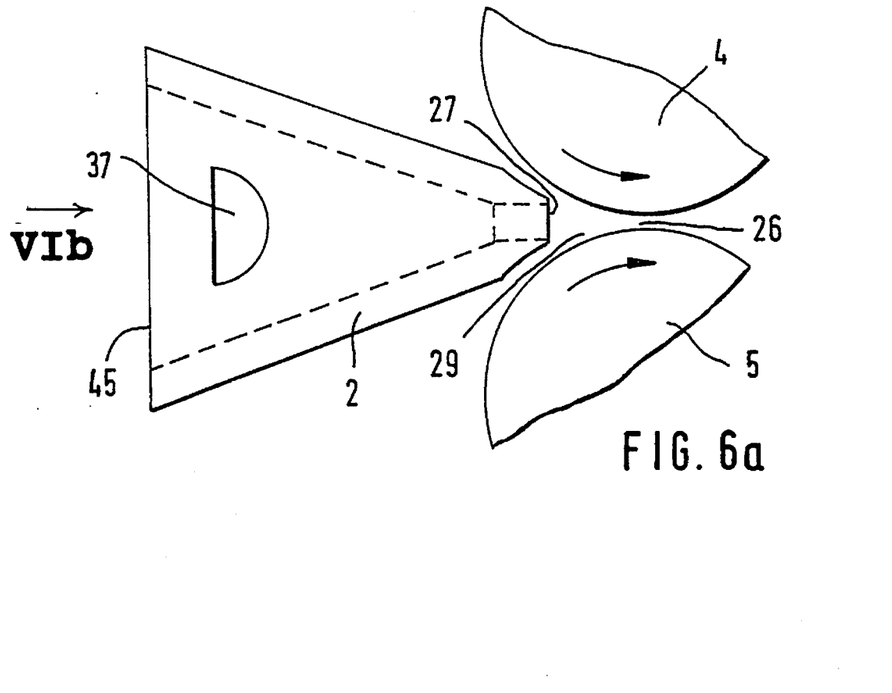
FIG. 6a is a schematic side elevational view illustrating the position of the sliver guide relative to the adjoining pull-off roll pair.

Turning to the embodiment illustrated in side elevation in FIG. 6a, the sliver guide outlet 27 is situated in the bight of the pull-off rolls 4 and 5 to ensure the smallest possible distance between the sliver guide outlet 27 and the nip 26 of the pull-off rolls 4, 5. A vent 37 is provided in the sliver guide wall in the vicinity of the sliver inlet 45 of the sliver guide 2.

Figure 6B:
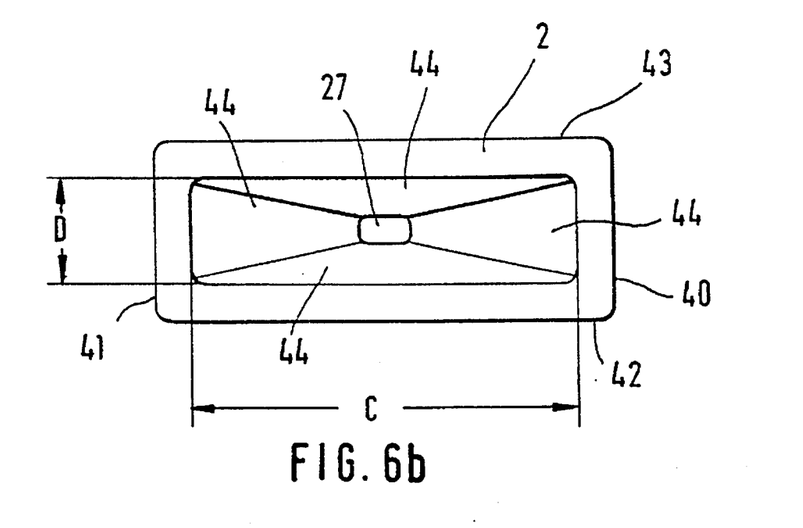

FIG. 6b shows an end elevational view of the sliver guide 2 as seen in the direction of the arrow VIb in FIG. 6a. Thus, as seen in FIG. 6b, the sliver guide 2 has a cavity in the shape of a hollow truncated pyramid with rounded edges. The hollow truncated pyramid is formed by the counter wall 41, the lateral wall 40, the bottom wall 42 and the top wall 43. The four faces bounding the cavity of the sliver guide 2 are of trapezoidal shape and constitute sliver contact faces 44. The bottom face 42 and the top face 43 are of identical size and have, at the sliver guide inlet 45, a dimension C which is significantly greater than the length dimension D of the counterface 41 and the lateral wall 40.

Figure 7:
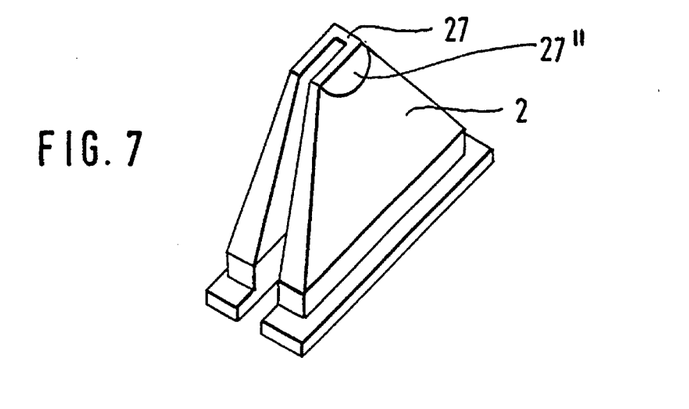
FIG. 7 is a perspective view of a sliver guide according to the invention.

FIG. 7 illustrates a sliver guide 2 in a perspective illustration. The region of the sliver guide outlet 27 is tapered as shown at 27" to ensure the smallest possible distance from the nip 26 of the pull-off rolls 4, 5.

Figure 8A:
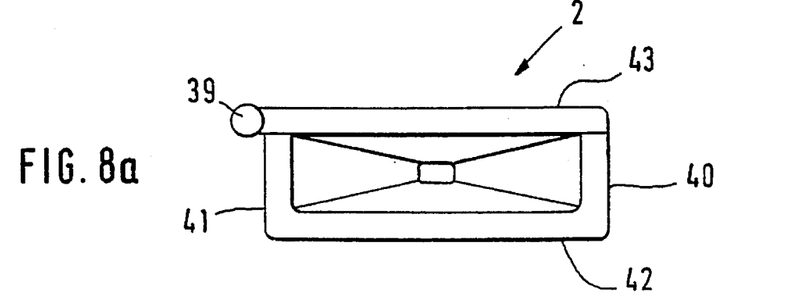
FIG. 8a is a rear elevational view of a sliver guide with the top wall pivoted into the closed position.
Figure 8B:
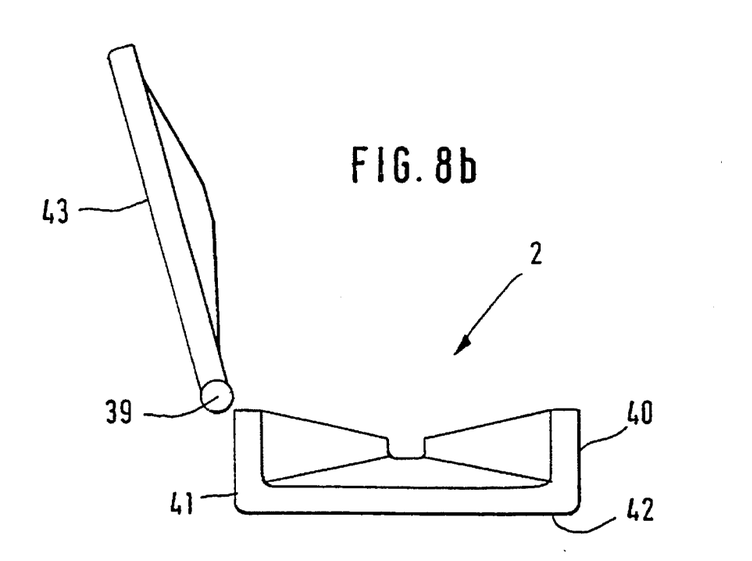
FIG. 8b is a view similar to FIG. 8a but illustrating the top wall in an upwardly pivoted, open position.

The embodiment illustrated in FIG. 8a corresponds essentially to that shown in FIGS. 6a, 6b except that the top wall 43 is pivotal to assume a closed position (FIG. 8a) and an upwardly pivoted open position (FIG. 8b) for cleaning purposes.

Figure 9A:
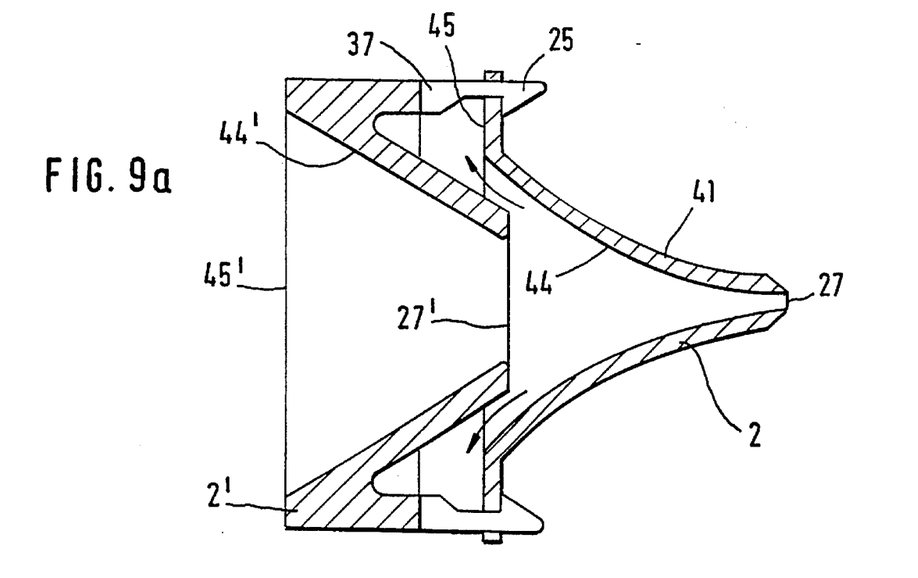
FIG. 9a is a sectional side elevational view of a further preferred embodiment illustrating two nested sliver guides removably secured to one another.
Figure 9B:
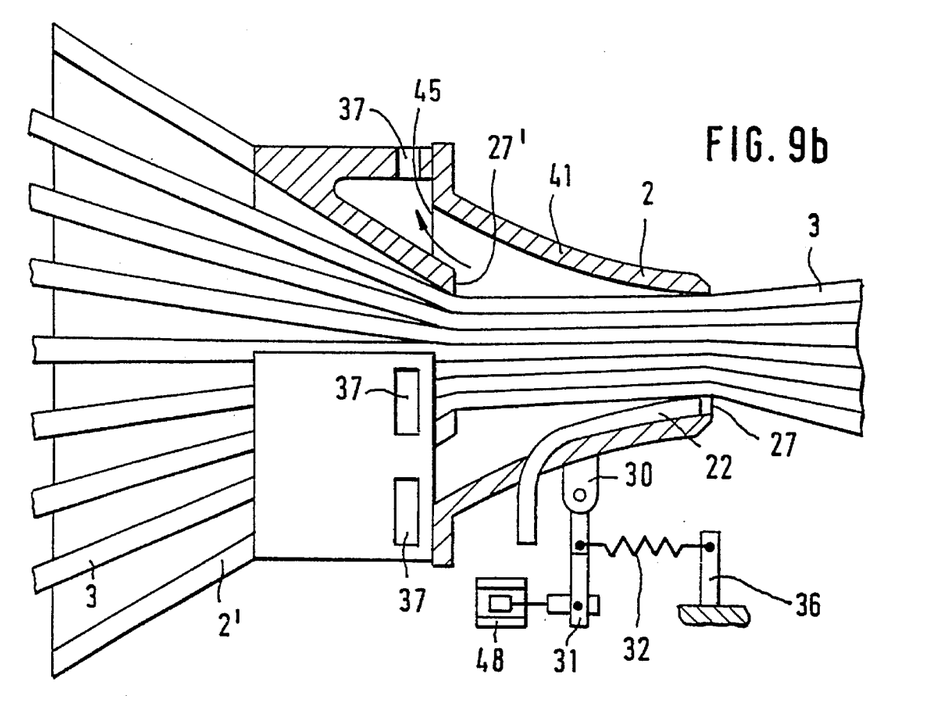
FIG. 9b is a sectional elevational view of a further preferred embodiment illustrating a one-piece dual sliver guide.

The embodiments illustrated in FIGS. 9a and 9b are two-stage sliver guides. In the embodiment shown in FIG. 9a, a sliver guide 2' is connected with the sliver guide 2 by means of a latch-type coupler 25. This connection may be readily released and thus the sliver guide 2' may be removed from the sliver guide 2 for an easy access and cleaning of the region of the vent 37 where debris such as fiber fragments or other impurities may collect. In this construction too, the slivers 3 enter the sliver guide inlet 45' and pass through the sliver guide 2' exiting therefrom through the sliver guide outlet 27' then pass through the sliver guide inlet 45 and leave the sliver guide 2 through the sliver guide outlet 27.

The construction of the embodiment illustrated in FIG. 9b is similar to that shown in FIG. 9a except that the sliver guides 2' and 2 constitute an integral component. The air vents 37 are, similarly to the FIG. 9 construction, situated at the side and in the top wall 43 of the sliver guide 2'.

Figure 10A:
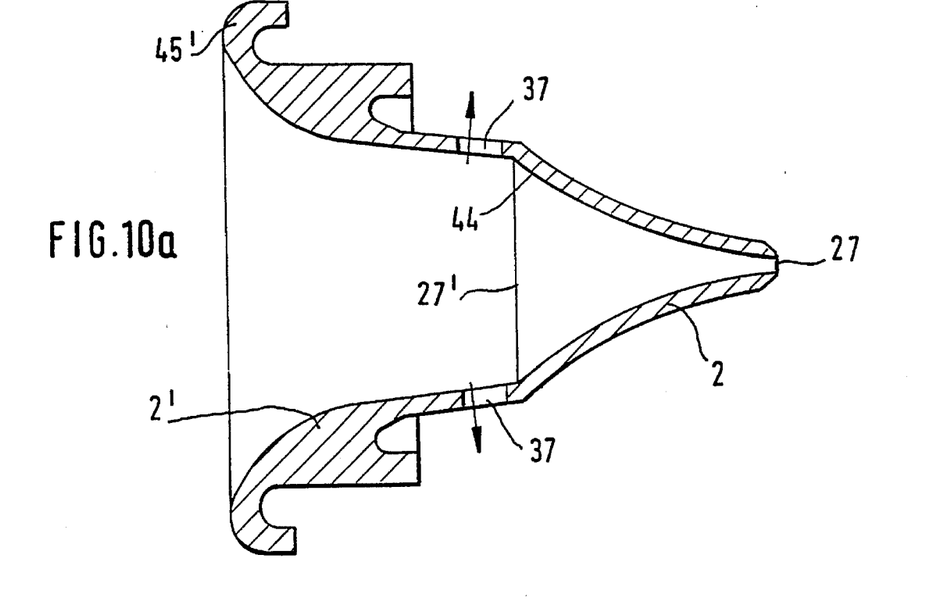
FIG. 10a is a sectional elevational view of a dual sliver guide including venting openings.
Figure 10B:
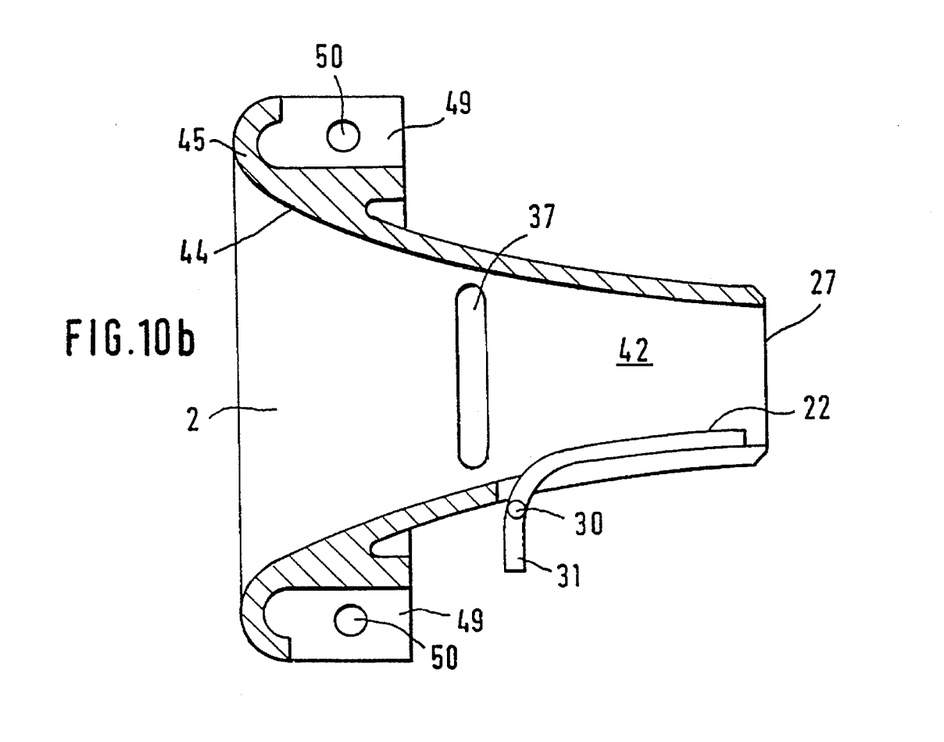
FIG. 10b is a sectional elevational view of another preferred embodiment having an elongated venting opening.

FIGS. 10a and 10b illustrate further embodiments; in the structure according to FIG. 10a, a two-stage sliver guide is shown, constituted by a one-piece component. In the region of the sliver guide outlet 27', that is, at the end of the first sliver guide 2', air vent openings 37 are provided.

The sliver guide 2 of FIG. 10b is relatively longer; thus, its side walls are converging to a lesser degree than in the earlier embodiments. The air vent openings 37 are provided in the bottom wall 42 and in the top wall (not visible). In the intake region the sliver guide 2 is provided with external flanges 49 which carry bore holes 50 for mounting the sliver guide on a machine component.

Figure 11A:
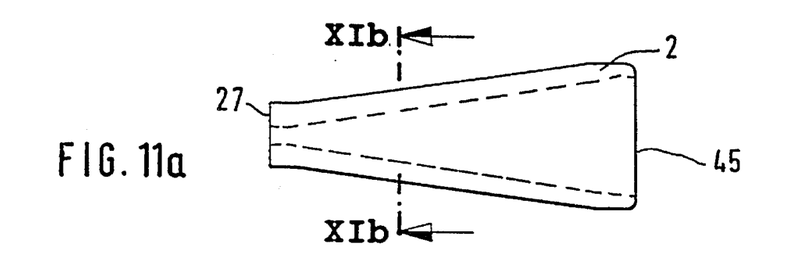
FIG. 11a shows a top plan view of a sliver guide.
Figure 11B:
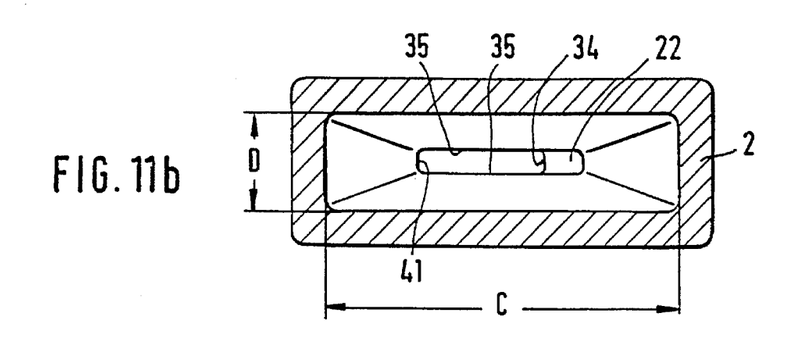

The embodiment illustrated in FIGS. 11a and 11b differ from the previous four embodiments in that the lateral walls are, in the longitudinal direction, that is, in the direction of sliver advance, not curved but have a linear configuration. In this embodiment too, the constriction 23 in which measurement takes place by virtue of the sensor element 22, has parallel wall faces 35. The sensor element 22 presses with its slide face 34 on the non-illustrated slivers, urging them against the counter wall face 41.

Figure 12A:
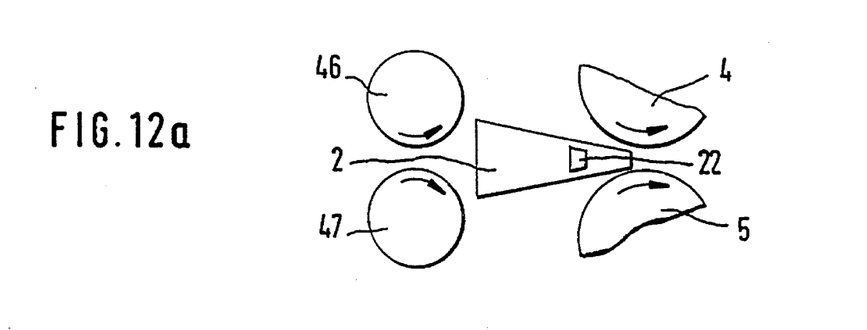
FIG. 12a is a schematic side elevational view of a sliver guide flanked upstream and downstream by two roller pairs.
Figure 12B:
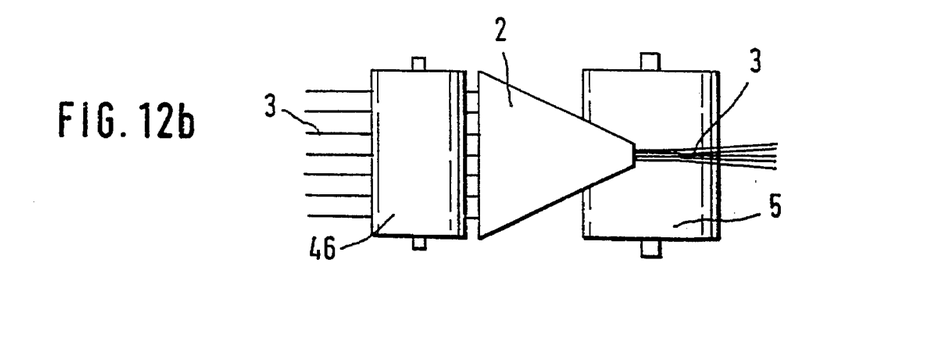

In the embodiment shown in FIGS. 12a and 12b, upstream of the sliver guide 2 a crushing roll pair 46, 47 is disposed whose purpose is to pull the slivers 3 from the sliver cans to thus aid and relieve the pull-off rolls 4, 5 arranged downstream of the sliver guide 2. The rpm of the rolls of the two roll pairs is so selected that between the two roll pairs practically no drafting of the sliver occurs. The pull-off rolls 4, 5 need only to overcome the frictional resistance between the slivers 3 and the sliver guide 2 generated by the compression of the slivers 3. The pulling forces thus exerted on the slivers 3 are reduced whereby a rupture of one or more slivers 3 is effectively prevented.

Figure 13:
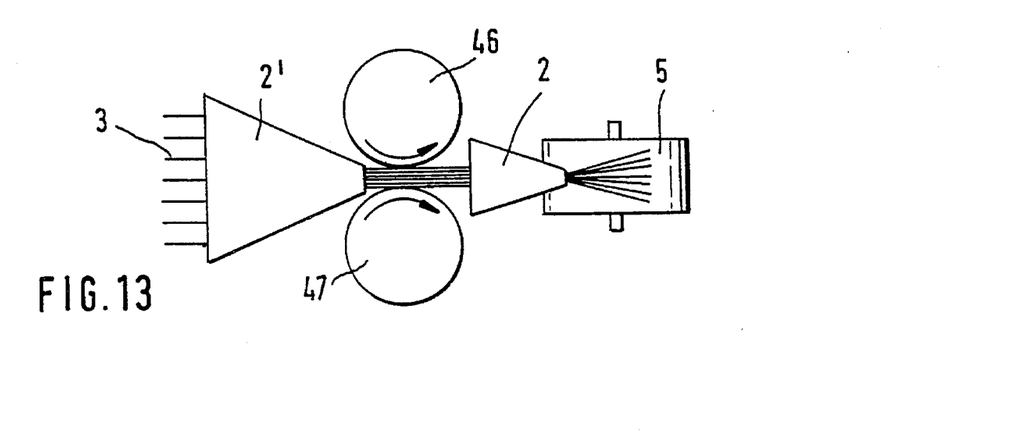
FIG. 13 is a schematic view of two serially arranged sliver guides including a first roll pair between the two sliver guides and a second roll pair (one roll being omitted for clarity) arranged downstream of the second sliver guide.

FIG. 13 illustrates an embodiment similar to the FIG. 12a and 12b construction except that two sliver guides 2, 2' are provided between which a crushing roll pair 46, 47 is inserted. The pull-off rolls 4, 5 (only the latter is shown for clarity) are positioned vertically.

Figure 14A:
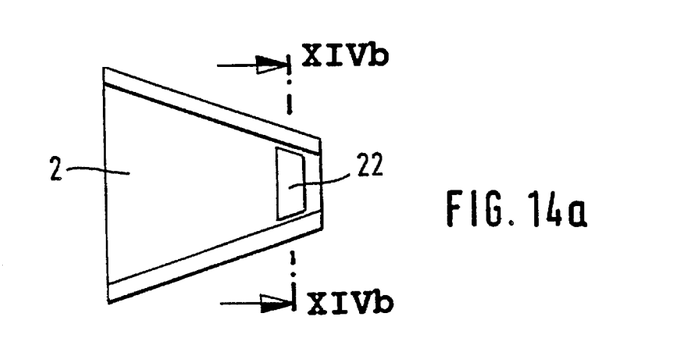
FIG. 14a is a schematic top plan view of a sliver guide having a vertically arranged sensor element.
Figure 14B:
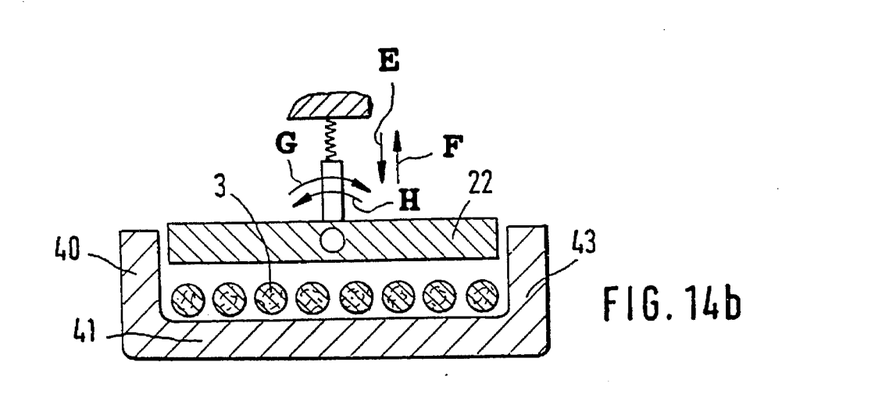

FIGS. 14a and 14b show an alternative arrangement of the sensor element 22. In the embodiments described so far, the sensor element 22 passes through a narrow side of the sliver guide 2 and compresses the slivers 3 such that the expansion in the transverse region, that is, the region C according to FIG. 11b has been reduced. According to the alternative shown in FIGS. 14, 14b, the dimension D is reduced, that is, the slivers 3 are condensed from above, along the narrower dimension of the sliver guide cavity. The sensor element is so constructed that in addition to its sensing motion (directions E, F), that is, its condensing (compressing) motion in the direction of the slivers 3, it may also perform a pivotal (tilting) motion (directions G, H) to thus take into account the possibility that slivers 3 of different thicknesses may be situated next to one another.

It will be understood that the above description of the present invention is susceptible to various modifications, changes and adaptations, and the same are intended to be comprehended within the meaning and range of equivalents of the appended claims.

What is claimed is:

1. A drafting frame comprising
   (a) drafting means for drafting a plurality of slivers running in an advancing direction and for combining the slivers into a single sliver;
   (b) a sliver guide situated upstream of said drafting means as viewed in said advancing direction; said sliver guide having wall means defining a cavity for guiding therein the plurality of slivers; said wall means converging in said advancing direction for gathering the slivers in a side-by-side orientation in a single plane; said wall means including a counterface;
   (c) a sensor element supported for displacement relative to said sliver guide; said sensor element having a sliver-contacting face movable toward and away from said counterface and defining therewith a constriction of said sliver guide;
   (d) force-exerting means exerting a force on said sensor element for urging said sliver-contacting face towards said counterface to consolidate the slivers running through said constriction;
   (e) transducing means coupled to said sensor element for emitting a signal representing excursions of said sensor element in response to thickness fluctuations of the slivers running through said constriction; and
   (f) a pull-off roll pair situated downstream of said sliver guide and upstream of said drafting means; said pull-off roll pair defining a nip between which the slivers pass; said pull-off roll pair pulling said slivers from said sliver guide.

2. The drafting frame as defined in claim 1, wherein said wall means further define a throughgoing lateral aperture; said sensor element passing through said aperture from an exterior of said sliver guide; said sliver-contacting face of said sensor element being positioned in said cavity.

3. The drafting frame as defined in claim 1, wherein said sliver guide has a sliver outlet through which the slivers exit from said sliver guide; said sliver outlet being situated in an immediate vicinity of said nip.

4. The drafting frame as defined in claim 1, wherein said sliver guide has a sliver outlet through which the slivers exit from said sliver guide; said constriction being situated in an immediate vicinity of said sliver outlet.

5. The drafting frame as defined in claim 2, further comprising support means for pivotally supporting said sensor element exteriorly of said sliver guide.

6. The drafting frame as defined in claim 5, wherein said support means is mounted on said sliver guide.

7. The drafting frame as defined in claim 5, wherein said sensor element has first and second arms joined together at a location of connection; said support means being coupled to said sensor element at said location of connection; said first arm carrying said sliver-contacting face.

8. The drafting frame as defined in claim 7, wherein said force-exerting means is connected to said second arm of said sensor element.

9. The drafting frame as defined in claim 1, wherein said force-exerting means includes means for exerting a resilient force to said sensor element.

10. The drafting frame as defined in claim 1, wherein said transducing means comprises an inductive measuring element including a plunger armature and a coil cooperating therewith.

11. The drafting frame as defined in claim 1, wherein said force-exerting means includes means for exerting a force sufficient to consolidate said slivers essentially to a cross-sectional area void of air spaces.

12. The drafting frame as defined in claim 1, wherein said constriction is bounded by two parallel faces of said wall means; a portion of said sensor element being inserted between said two parallel faces.

13. The drafting frame as defined in claim 12, wherein said counterface is oriented perpendicularly to said two parallel faces.

14. The drafting frame as defined in claim 1, further comprising means for adjusting a force of said force-exerting means.

15. The drafting frame as defined in claim 1, wherein said sliver guide is a first sliver guide; further comprising a second sliver guide disposed upstream of said first sliver guide; a space between said first and second sliver guides being in communication with the ambient atmosphere.

16. The drafting frame as defined in claim 1, wherein said wall means include an air vent opening.

17. The drafting frame as defined in claim 1, wherein said wall means define a sliver inlet opening and a sliver outlet opening of said sliver guide; at least one of the sliver inlet and sliver outlet openings have a rectangular sliver passage area.

18. The drafting frame as defined in claim 1, wherein said wall means define a sliver outlet opening extending into a bight defined by said pull-off roll pair.

19. The drafting frame as defined in claim 1, further comprising means for adjusting a position of said counterface.

20. The drafting frame as defined in claim 1, further comprising a crushing roll pair supported upstream of said sliver guide.

21. The drafting frame as defined in claim 1, wherein said constriction has a rectangular sliver passage area.

22. The drafting frame as defined in claim 1, wherein said cavity has a hollow truncated pyramid shape tapering in said advancing direction.

23. In a method of measuring the thickness of a running sliver assembly at a sliver input of a drafting frame, including the steps of gathering individual slivers by a guide to form the sliver assembly constituting a plurality of side-by-side positioned slivers arranged in a single plane;

pulling the sliver assembly through the guide by a pair of cooperating pull-off rolls situated downstream of said guide as viewed in a direction of sliver run through said guide;

advancing the slivers from the pull-off rolls to a drafting unit situated downstream of said pull-off rolls;

sensing the thickness of said sliver assembly; and generating electric signals representing thickness variations of the running sliver assembly;

the improvement wherein said sensing step includes the step of laterally slidingly contacting the sliver assembly in said guide by a sensor element for consolidating the sliver assembly in said single plane to cause the slivers to assume a mutually contacting relationship and for generating said electric signals.

24. The method as defined in claim 23, further comprising the steps of (d) applying said signals to a regulator; and (e) regulating the rpm of a roll drive motor of said drafting means.

* * * * *